United States Patent

[11] 3,580,630

[72] Inventor Paul E. Fetter
R.D. #1, Selinsgrove, Pa. 17870
[21] Appl. No. 874,461
[22] Filed Nov. 6, 1969
[45] Patented May 25, 1971

[54] UTILITY HUMP SEAT AND DOUBLE TRAY
10 Claims, 8 Drawing Figs.
[52] U.S. Cl. .................................................. 297/125,
297/232, 297/378
[51] Int. Cl. ...................................................... A47b 85/04
[50] Field of Search .......................................... 297/232,
378, 379, 124, 125, 112; 108/44; 312/235 (A),
235 (R); 5/43

[56] References Cited
UNITED STATES PATENTS
2,716,775  9/1955  Kenimer ..................... 297/124
2,942,649  6/1960  Wells ........................... 5/43
3,048,855  8/1962  Frank .......................... 297/124
3,336,077  8/1967  Radke .......................... 297/378
3,336,078  8/1967  Haley .......................... 297/232
3,340,547  9/1967  Welti .......................... 297/232

Primary Examiner—Francis K. Zugel
Attorney—Baldwin, Wight, & Brown

ABSTRACT: This disclosure relates to a convertible seat tray constructed to overlie conventional humped engine housings of utility-type trucks, the seat tray including a back tray which is at all times accessible and a front tray which is accessible when a backrest is in its collapsed position. The front tray is formed by a ledge secured to the back side of the backrest and thus does not interfere with an occupant when the backrest is in its upright position.

PATENTED MAY 25 1971
3,580,630
SHEET 1 OF 2
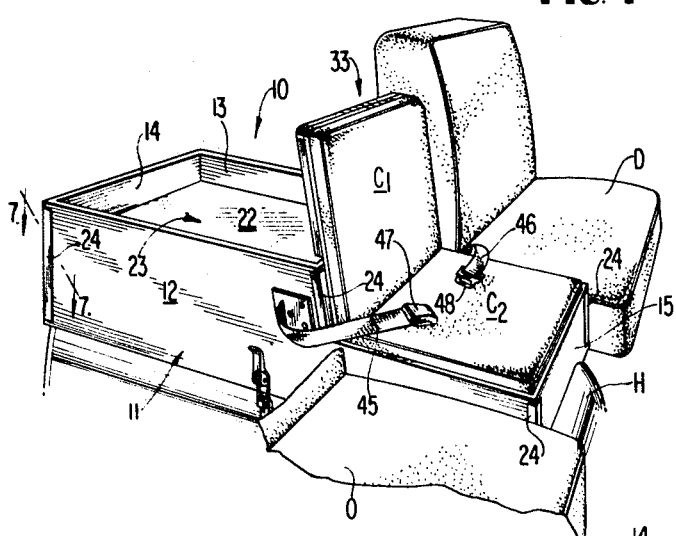
FIG. 1
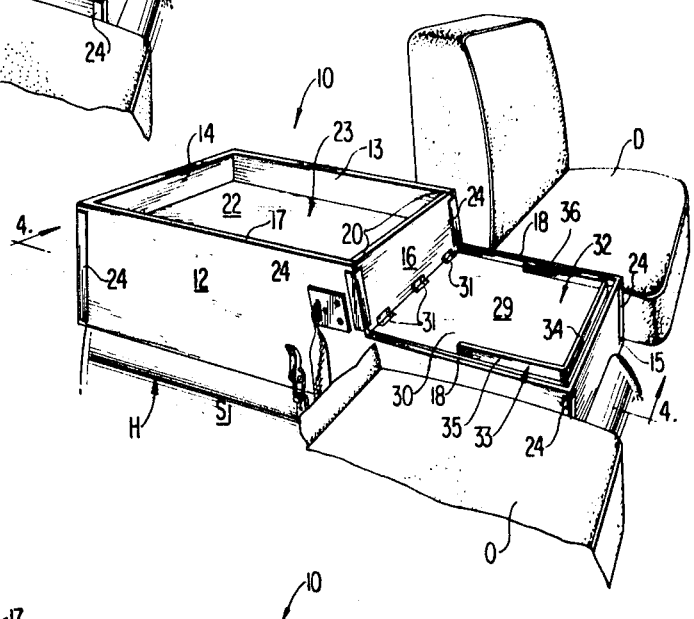
FIG. 2
FIG. 7
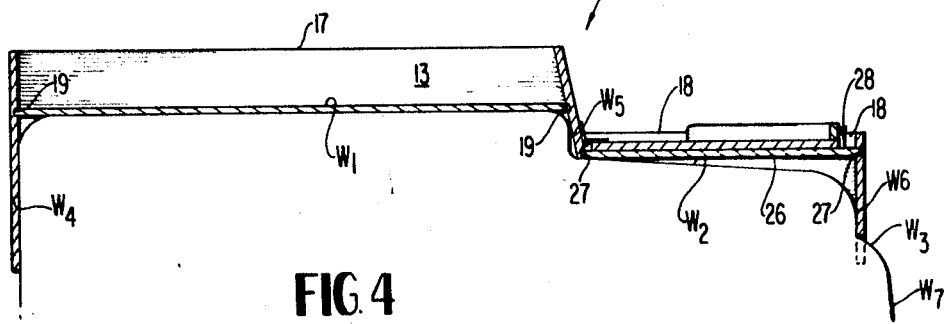
FIG. 4
INVENTOR
PAUL E. FETTER
BY Baldwin Wight Diller & Brown
ATTORNEYS

PATENTED MAY 25 1971

INVENTOR
PAUL E. FETTER

BY Baldwin Wight Diller & Brown

ATTORNEYS

UTILITY HUMP SEAT AND DOUBLE TRAY

A primary object of this invention is to provide a convertible seat and double tray for use with utility trucks, such as Ford Econoline Trucks, Chevrolet Van and Sport Van Trucks, G.M.C. Handi Van and Handi Bus Vehicles, as well as similar vehicles which include an engine position between the occupant and passenger seats. Such engines are conventionally covered by a housing which is of a humped or stepped configuration with the lowermost portion thereof forwardmost.

A primary object of this invention is to provide a convertible seat tray which is contoured to the configuration of the engine housing to thereby assure stability when in use, and by so contouring the seat tray to the configuration of the engine housing, more headroom is achieved than in known conventional seat trays.

Still another object of this invention is to provide a novel convertible seat tray wherein a pair of top walls are recessed beneath uppermost edges of side, front and back walls to form front and back trays or compartments, while a backrest is provided with a ledge to form another tray or compartment when the latter is in its nonoccupant-supporting position.

With the above and other objects in view that will hereinafter appear, the nature of the invention will be more clearly understood by reference to the following detailed description, the appended claims and the several views illustrated in the accompanying drawings.

IN THE DRAWINGS:

FIG. 1 is a fragmentary perspective view of the novel convertible seat tray of this invention and illustrates an occupant-supporting position thereof.

FIG. 2 is a similar side perspective view of the seat tray and illustrates a second position in which articles may be supported in front and back trays or compartments, with the front compartment being formed in part by a backrest.

FIG. 4 is an enlarged sectional view taken generally along the line 4—4 of FIG. 2 and illustrates the manner in which the seat tray is contoured to the configuration of a conventional humped or stepped engine housing.

FIG. 7 is an enlarged fragmentary sectional view taken generally along lines 7—7 of FIG. 1, and illustrates the manner in which angle brackets are employed to secure various pairs of walls to each other.

Figure 3:
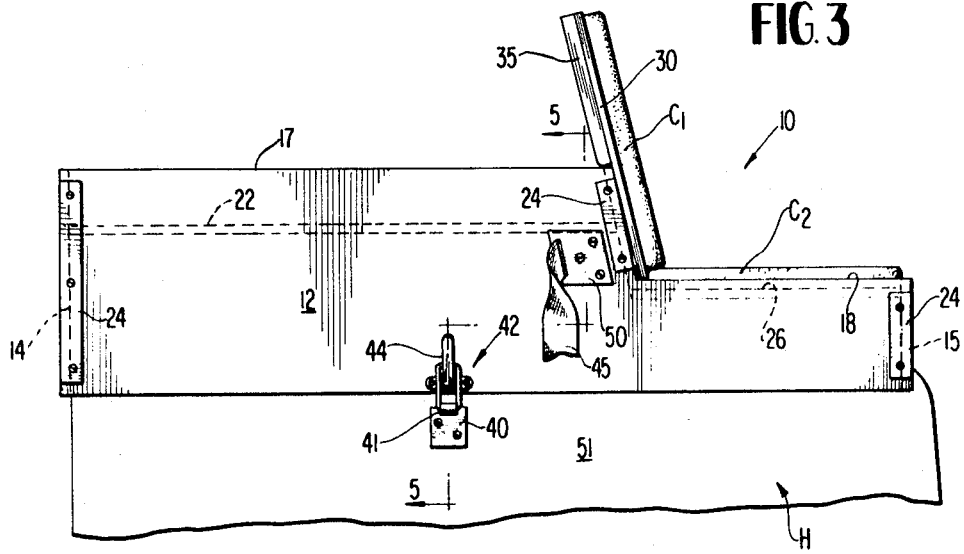
FIG. 3 is a side elevational view of the convertible seat tray, and more clearly illustrates the stepped configuration thereof.

Reference is first made to FIGS. 1 and 2 of the drawings which illustrates a convertible seat tray which is generally designated by the reference numeral 10. The seat tray 10 is positioned upon an engine housing H, the latter of which is located between a driver's seat D and an occupant's seat O. Though the particular vehicle with which the seat tray 10 is associated is not illustrated, it is to be understood that the vehicle is any one of a number of so-called "utility" trucks characterized by the location of the engine housing being positioned between the driver and occupant seats. As is best illustrated in FIG. 4, such conventional engine housings H are generally of a stepped or humped configuration having generally horizontally disposed walls $W^1$, $W^2$ and $W^3$, the latter of which is located forwardmost in the vehicle interior. The engine housing H is additionally provided with sidewalls $S^1$, $S^2$ (FIG. 5) a rear back wall $W^4$, and one or more front vertical walls $W^5$ to $W^7$, the number and location of which will vary somewhat depending on the particular vehicle and/or the size of the engine associated with the engine housing H.

The seat tray includes a body, generally designated by the reference numeral 11, formed by a pair of sidewalls 12, 13, a back wall 14, a front wall 15 and an intermediate wall 16.

The sidewalls 12, 13 are identical, and each is of a generally stepped configuration defined by an uppermost edge 17, a lowermost edge 18, and a generally vertically disposed intermediate edge 20.

The back wall 14 is preferably rectangular, as is the intermediate wall 16. Also, the front wall 15 has a lowermost generally inverted U-shaped slot or recess 21 (FIG. 6) which is contoured to the configuration of the wall $W^3$ of the housing H.

The walls 12 through 16 are preferably constructed from wood, but the same may be constructed from metal, plastic or similar relatively rigid material.

A back top wall 22 is housed within the walls 12, 13, 14 and 16, and in conjunction therewith defines an article-receiving compartment or tray 23. The top wall 22 is likewise of a rectangular configuration and the edges (unnumbered) thereof are received in grooves or slots 19 (FIG. 4) of each of the walls 12, 13, 14 and 16.

At each corner, defined by the walls 12, 14; 13, 14; 13, 16 and 12, 16 there is located an identical metallic angle bracket 24 (FIG. 7) which is secured by screws or similar conventional fastening means to the respective walls. As shown in FIG. 7, it is also desirable to provide a recess 25 in one wall at each corner to impart additional rigidity to the body 11. Although the wall 13 is provided with a recess 25 it is to be understood that it is immaterial which of the walls 12, 14 or the remaining walls of each corner, is provided with the recess 25. It is also to be understood that though the angle brackets 24 are identical in structure, the pair of angle brackets at the corners of the walls 13, 16 and 12, 16 are somewhat shorter than the angle brackets at the corners of the walls 12, 14 and 13, 14.

Figure 6:
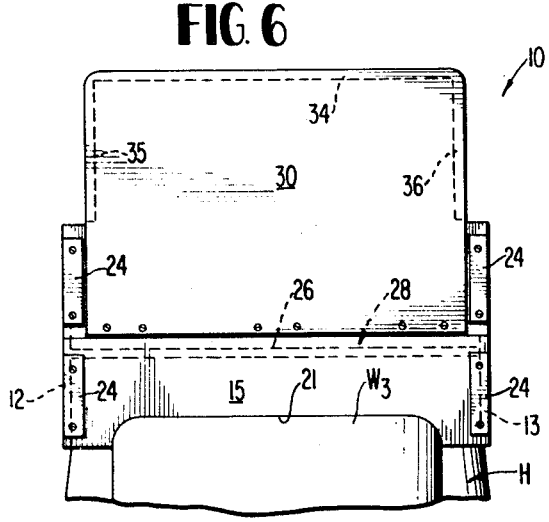
FIG. 6 is a front view of the seat tray looking from right to left in FIG. 3 with the cushions removed, and illustrates the manner in which a front wall of the seat tray is contoured to a portion of the engine housing.

A front top wall 26 is likewise housed within the sidewalls 12, 13, the front wall 15, and the intermediate wall 16. Each of the walls 12, 13, 15 and 16 is likewise provided with a groove or recess 27 into which is received the edges (unnumbered) of the generally rectangular top wall 26. As is best illustrated in FIGS. 3, 4 and 6, it is to be noted that the front top wall 26 is recessed below the edges 18, 18 of the sidewalls 12, 13 as well as below the uppermost edge (unnumbered) of the front wall 15, thereby forming a second front tray or compartment 28 defined by uppermost edges of the walls 12, 13, 15 and 16. Furthermore, at the corners of the walls 12, 15 and 13, 15 there are provided brackets 24 of the type heretofore described to maintain the edges of the top panel 26 within the recesses 27.

A dual-functioning support 30 of a generally rectangular configuration is hingedly secured to the intermediate wall 16 along one of its edges (unnumbered) by a plurality of conventional hinges and fasteners each collectively designated by the reference numeral 31. The hinges 31 permit the support 30 to be moved from the position shown in FIG. 2 in which the support 30 functions as a tray or compartment, to the position shown in FIG. 1 in which the support 30 functions as a backrest against which an occupant may directly rest his back, or preferably against which may be positioned a cushion $C^1$. When positioned as shown in FIG. 2 a compartment 32 is formed by ledge means 33 in the form of a U-shaped element carried by the support 30 having a bight portion 34 and a pair of legs 35, 36. In addition the upper surface of the support 30 lies below the edges 18, 18 of the sidewalls 12, 13 as is best shown in FIGS. 2 and 4 to prevent articles from accidentally or inadvertently falling off the surface 29 when placed in the area between the intermediate wall 16 and the ends (unnumbered) of the legs 35, 36 remote from the bight portion 34. In other words, the compartment 32 is defined by the ledge means 33, the exposed portion of each of these sidewalls 12, 13 between the ends of the legs 35, 36 and the intermediate wall 16.

From the foregoing, it is to be appreciated that when the support 30 is in the position shown in FIG. 1, another cushion $C^2$ is positioned within the compartment 28 to thereby permit an occupant to sit upon the cushion $C^2$ while the cushion $C^1$ functions as a back rest in a manner heretofore described. Thus, as shown in FIG. 1, there is at least one compartment, namely, the back compartment 23 which is at all times accessible to the driver, an occupant seated in the occupant's seat 0, or a person seated upon the cushion $C^2$. However, it is to be appreciated that if the cushions $C^1$ and $C^2$ were removed and the support 30 left in its upright position articles could be placed in the compartment 28, though the articles would necessarily have to be removed if the support 30 were lowered to the position shown in FIG. 2. Thus, though designed principally for operation as shown in FIGS. 1 and 2, it is to be understood that the seat tray 10 is further operable in a third position wherein the cushions $C^1$, $C^2$ are removed, the support 30 is in its upright position, and articles are housed within the compartment or tray 28.

Figure 5:
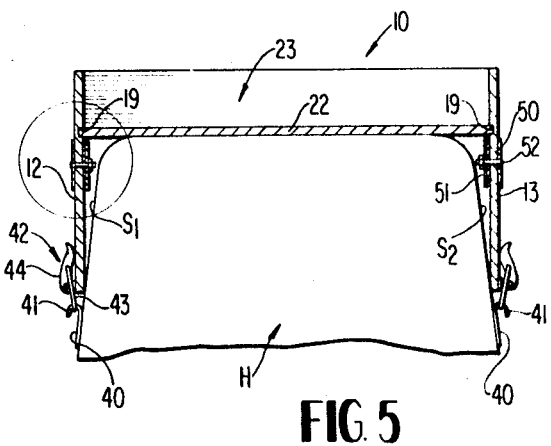
FIG. 5 is a sectional view taken generally along line 5—5 of FIG. 3, and illustrates a recessed top wall of the back tray or compartment, and a pair of releasable securing means for maintaining the seat tray in position upon the engine housing.

Reference is now made to FIG. 5 which illustrates the manner in which the convertible seat tray 10 is secured to the engine housing H. A pair of identical brackets 40 having downwardly opening hooks 41 are secured to the sidewalls $S^1$, $S^2$ of the housing H. A conventional safety latch 42 having a bail 43 and an overcenter handle 44 is conventionally secured to each of the sidewalls 12, 13. The latches 42 are opened and closed in the conventional manner to permit the convertible seat tray 10 to be rapidly installed upon or removed from the engine housing H.

Figure 8:
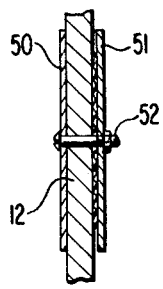
FIG. 8 is an enlarged fragmentary view of the encircled portion of FIG. 5, and illustrates the manner in which a seatbelt is secured to a sidewall of the seat tray.

The convertible seat rack 10 is further provided with a safety belt formed by a pair of straps 45, 46 respectively carrying a conventional safety belt buckle 47 and a safety belt loop 48. Each of the straps 45, 46 is secured to the respective sidewalls 12, 13 in a manner best illustrated in FIGS. 3 and 8 of the drawings to which reference is now made. Each of the sidewalls 12, 13 is provided with a slot (not shown) of a length and width corresponding generally to but slightly larger than the width and thickness of the straps 45, 46. Each strap 45, 46 is passed through a slot (unnumbered) of a front plate 50 (FIGS. 3 and 8), through the slot of the associated sidewall 12, 13 and is sandwiched between an inner surface (unnumbered) of the sidewall and another metallic plate 51. As thus assembled, a plurality of nuts and bolts 52 secure each of the straps 45, 46 to the respective sidewalls 12, 13.

Reference is now made to FIGS. 1, 3 and 6 of the drawings which indicates the purpose for the U-shaped ledge 33, other than that of in part defining the compartment 32. As is best illustrated in FIGS. 3 and 6, the legs 35, 36 terminate just above the uppermost edges 17 of the sidewalls 12, 13. If the terminal ends of the legs are extended downwardly further than illustrated, the support 30 would not contact the intermediate wall 16 but instead the intermediate wall 16 would be contacted by the extended legs of the ledge 33 imparting a strain thereon which is highly undesirable. Furthermore, if the legs 35, 36 were progressively increased toward the hinges 31, 31 it would be appreciated that it would be impossible to pivot the support 30 to its inclined position. Thus, the novel construction of the ledge 33 permits the support 30 to be swung to the position shown in FIG. 3 at which time the weight of a person leaning against the cushion $C^1$ is distributed evenly across the entire length of the intermediate wall 16.

While preferred forms and arrangement of parts have been shown in illustrating the invention, it is to be clearly understood that various changes in details and arrangements of parts may be made without departing from the spirit and scope of this disclosure.

What I claim is:

1. A convertible seat tray comprising a body defined by a pair of sidewalls, each sidewall being of a stepped configuration defined by an uppermost sidewall edge joined to a lowermost sidewall edge by an intermediate edge, front and back walls joined to and between said sidewalls at respective front and rear edges thereof, an intermediate wall joined to and between said sidewalls adjacent said intermediate edges, a first top wall housed within said sidewalls, said back wall and said intermediate wall and below uppermost edges thereof thereby defining an article-receiving tray, a second top wall housed within said sidewalls, said front wall and said intermediate wall, an article support corresponding generally in size to said second top wall, and hinge means joining said article support to said body adjacent said intermediate wall whereby said article support is movable from an article-supporting position overlying said second top wall to a generally vertical backrest position adjacent said intermediate wall.

2. The convertible seat tray as defined in claim 1 wherein said article support includes ledge means at least partially bounding the periphery thereof to define a second article-receiving tray when said last-mentioned tray is in said article-supporting position.

3. The convertible seat tray as defined in claim 1 wherein said second top wall is housed below the lowermost sidewall edges thereby defining a compartment adapted to receive a seat cushion when said article support is in said backrest position.

4. The convertible seat tray as defined in claim 1 including means carried by each sidewall for removably securing said seat tray in overlying relationship to a humplike engine housing with the first top wall adjacent an uppermost wall of the housing and the second top wall adjacent a lowermost wall of the housing.

5. The convertible seat tray as defined in claim 1 including seatbelt means connected to said sidewalls.

6. The convertible seat tray as defined in claim 2 wherein said ledge means is a ledge projecting upwardly from said article support when the latter is in its article-supporting position.

7. The convertible seat tray as defined in claim 2 wherein said ledge means is a ledge projecting upwardly from said article support when the latter is in its article-supporting position, and said ledge being of a generally U-shaped configuration opening in a direction toward said back wall.

8. The convertible seat tray as defined in claim 2 wherein said second top wall is housed below the lowermost sidewall edges thereby defining a compartment adapted to receive a seat cushion when said article support is in said backrest position.

9. The convertible seat tray as defined in claim 8 wherein said ledge means is a ledge projecting upwardly from said article support when the latter is in its article-supporting position.

10. The convertible seat tray as defined in claim 8 wherein said ledge means is a ledge projecting upwardly from said article support when the latter is in its article-supporting position, and said ledge being of generally U-shaped configuration opening in a direction toward said back wall.